United States Patent [19]

Moore

[11] 4,426,874

[45] Jan. 24, 1984

[54] STRAIN GAGE CALIBRATION

[75] Inventor: Thomas C. Moore, Poquoson, Va.

[73] Assignee: The United States of America as represented by the Administrator of the National Aeronautics and Space Administration, Washington, D.C.

[21] Appl. No.: 372,279

[22] Filed: Apr. 27, 1982

[51] Int. Cl.³ .............................................. G01L 25/00
[52] U.S. Cl. ......................................... 73/1 B; 374/1
[58] Field of Search .......................... 73/1 B, 765, 766; 364/508; 374/1

[56] References Cited

U.S. PATENT DOCUMENTS

| | | | |
|---|---|---|---|
| 2,357,643 | 9/1944 | Floyd | 73/1 B |
| 3,005,332 | 10/1961 | McClintock . | |
| 3,447,462 | 6/1969 | Pien | 73/766 |
| 3,448,607 | 6/1969 | Russell | 73/766 |
| 3,451,030 | 6/1969 | Garfinkel . | |
| 3,934,452 | 1/1976 | Prevorsek et al. . | |
| 3,956,919 | 5/1976 | Vranas | 73/1 B |
| 4,115,174 | 9/1978 | Bauer et al. . | |

FOREIGN PATENT DOCUMENTS 2658324  6/1978  Fed. Rep. of Germany ............ 73/1

Primary Examiner—Herbert Goldstein
Attorney, Agent, or Firm—Howard J. Osborn; John R. Manning; Wallace J. Nelson

[57] ABSTRACT

A method for calibrating transducer type strain gages 10 is disclosed which utilizes a temporary bonding system for accurately predetermining the individual apparent strain curve characteristics of the gages 10 and subsequently employs a computer to match the apparent strain curves of the individual gages 10 to determine which gages 10 should be used together. The temporary bonding system requires a test block 25 on which the gages 10 are temporarily bonded, several thermocouples 15 for monitoring temperature and a data acquisition system for recording apparent strain data. Initially, a group of strain gages 10 are attached to the test block 25 using a bonding agent that disintegrates at high temperatures. The gages 10 are then wired to an appropriate data acquisition system and data collected throughout a predetermined temperature excursion. Once the data is obtained, the test block 25 is heated until the bonding agent disintegrates, freeing the gages 10 from the test block 25. The gages are then disconnected from the data acquisition system and cleaned, thereby ready for use on transducers.

3 Claims, 7 Drawing Figures

STRAIN GAGE CALIBRATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a method for calibrating transducer type strain gages and more particularly to a method for accurately predetermining the individual apparent strain curve characteristics of strain gages prior to actual use.

A strain gage is a device which uses the change of electrical resistance of a wire under strain to measure stress. Because resistance changes with both strain and temperature, however, the apparent strain due to temperature change must be compensated for if accurate data is to be collected.

Inherent differences exist in the apparent strain curves of all resistance type strain gages. Because the differences are magnified at cryogenic temperatures, a resultant apparent strain arises when four arbitarily chosen strain gages are wired in a four-active-arm Wheatstone bridge circuit. Previously, corrections for apparent strain were made using a temperature sensitive wire placed internally in the Wheatstone bridge circuit. The correction wire has inherent problems, however, in that long lengths are often required and physical space on most transducers is limited. In addition, long pieces of this apparent strain correction wire are difficult to place in intimate contact with the strain-gaged surface and can cause erroneous loop data.

The wide operating temperature range of the National Transonic Facility at Langley Research Center makes it necessary to employ a force balance which has a minimized temperature induced output over the entire temperature range and which is capable of providing aerodynamic load data under cryogenic temperature conditions. Previous methods of correcting for temperature in the cryogenic temperature range are inaccurate due to their typically nonlinear, temperature induced response. It is preferable, therefore, in developing transducers with four-arm strain-gage bridges, to use strain gages wherein the individual apparent strain curves are accurately predetermined and matched. By matching strain gages prior to installation on transducers, the inaccuracies accompanying unmatched strain gages are greatly reduced, and the need to compensate for temperature induced strain gage output is virtually eliminated.

Accordingly, it is an object of this invention to provide a novel method for accurately predetermining the individual apparent strain curve characteristics of strain gages prior to actual use.

Another object of this invention is to provide a method of matching strain gages through data comparison of apparent strain response.

Still another object of the invention is to provide a method of matching strain gages whereby the gages are matched at points throughout the temperature excursion, as well as at the end point, thereby resulting in a decrease in nonlinear response and apparent strain.

Yet another object of the invention is to provide a method of matching strain gages whereby the initial accuracy for cryogenic transducers is greatly improved and less apparent strain correction wire is required.

SUMMARY OF THE INVENTION

The foregoing and other objects of the invention are achieved by providing a method for calibrating transducer type strain gages. The technique utilizes a temporary bonding system for accurately predetermining the individual apparent strain curve characteristics of the strain gages and subsequently employs a computer to match the apparent strain curves of the individual strain gages to determine which gages should be used together on transducers.

The temporary bonding system for matching strain gages requires a test block on which the gages are temporarily bonded, a number of strain gages, several thermocouples for monitoring temperature and a data acquisition system for recording apparent strain data. Initially, a group of strain gages are attached to the test block using a bonding agent that disintegrates at high temperatures. The gages are then wired to an appropriate data acquisition system and data collected throughout a predetermined temperature excursion. Once the data is obtained, the test block is heated until the bonding agent disintegrates, freeing the gages from the test block. The strain gages are then disconnected from the data acquisition system, cleaned, and thereby made ready for use on transducers.

Other advantages and objects of the present invention will be more readily apparent when the specification is taken in conjunction with the attached drawings to which it relates.

DETAILED DESCRIPTION OF THE INVENTION

Figure 1:
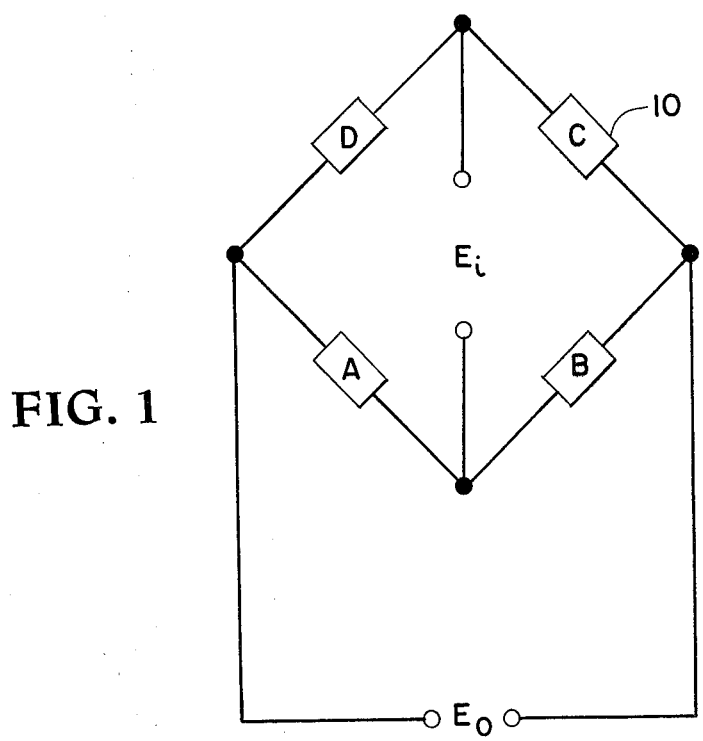
FIG. 1 is a schematic view of the Wheatstone bridge circuitry which is used in conjunction with the strain gages according to the present invention.

Referring to FIG. 1, there is shown a Wheatstone bridge resistor network employing a strain gage 10 in each of its four arms. When the Wheatstone bridge network is used with strain gages, it comprises a resistor network which is balanced such that the output of the network will be zero, $E_o = 0$, when an input voltage, $E_i$, is applied. When subsequent unbalance takes place in the resistances of the network, the output of the circuit changes. The principle of operation depends upon the deflection of the strain gages creating a change in resistance, thereby unbalancing the bridge circuit. As a result, for a given input, the output voltage varies proportionately and the voltage change can be read on appropriate instrumentation. Therefore, mechanical strain can be measured directly from the output data of the Wheatstone bridge circuit.

To ensure that the circuit is properly balanced and free from extrinsic error, strain gages 10 must be chosen such that in the absence of changes in strain, the output voltage $E_o$ remains constant at zero upon application of an input voltage, $E_i$. The general rule is that the Wheatstone bridge will be unbalanced only in proportion to the algebric difference of resistance changes in any two adjacent arms or in proportion to the algebric sum of the resistance changes in any two opposite arms. In terms of voltage this implies that $$E_o = (E_A + E_C) - (E_b + E_D) \qquad (1)$$

where, $E_o$ = output voltage
$E_A$ = voltage across strain gage A
$E_B$ = voltage across strain gage B
$E_C$ = voltage across strain gage C
$E_D$ = voltage across strain gage D When $E_o = 0$, the circuit is balanced. However, when the voltage across the individual strain gages changes without a concomitant change in strain, the circuit is forced out of balance, resulting in an erroneously induced output, i.e., an apparent strain.

Figure 2:
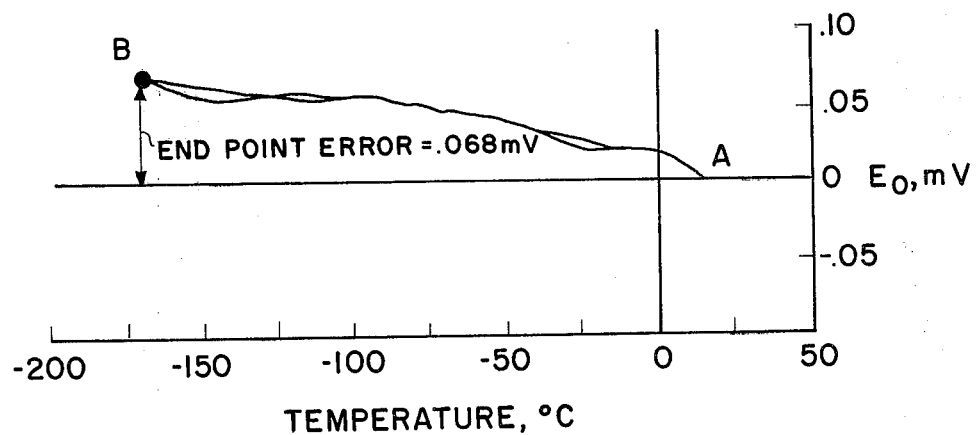
FIG. 2 is a graphic illustration of the apparent strain exhibited by typical strain gage cricuits due to temperature change.

In order to obtain accurate data from strain gage bridges during transient temperatures, several types of error associated with resistance strain gages must be overcome. FIG. 2 presents a graphic illustration of apparent strain due to temperature change in a Wheatstone bridge circuit. The vertical axis represents the bridge output voltage, $E_o$ and the horizontal axis represents temperature. Starting at point A, the circuit is subjected in incrementally decreasing temperature. Because voltage is a function of resistance and resistance may be altered by temperature, changes in temperature will precipitate a change in the voltage across the strain gages 10, thereby unbalancing the bridge circuit and inducing an erroneous circuit output. Thus, output voltage $E_o$ is a function of temperature. Curve AB represents the temperature induced output of the bridge circuit as the temperature is incrementally decreased from ambient to −170° C. and returned to ambient. Although the output deviates from $E_o = 0$ throughout the temperature excursion, the end point error, equal to 0.068 mV is the largest. This apparent strain must be compensated for if accurate data is to be collected.

Figure 3:
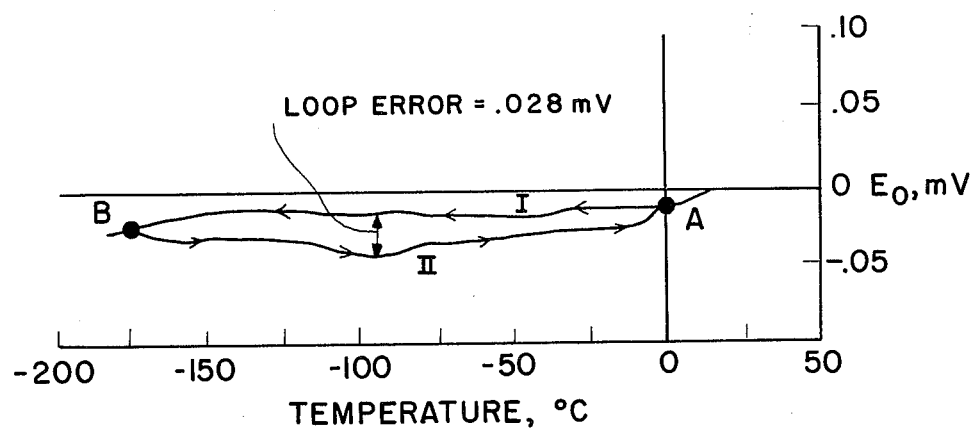
FIG. 3 is a graphic illustration of typical strain gage 'loop' error normally associated with transient temperatures.

FIG. 3 represents a graphic illustration of the 'loop' error associated with transient temperatures. Loop error can be characterized as the difference (lag) between the output of a bridge circuit during decreasing temperature and the output at the same temperature during increasing temperature. Curve I illustrates the circuit output as a function of temperature as the temperature is decreased from ambient to −185° C. Curve II illustrates the circuit response to increasing temperatures. The resulting loop error is 0.028 mV. This loop error, primarily the result of transient temperatures during the temperature excursion, is generally caused by the phenomenon that one or more legs of the bridge senses the changing temperature in advance of the others. It is desirable, therefore, to reduce this loop effect as much as possible.

Figure 4:
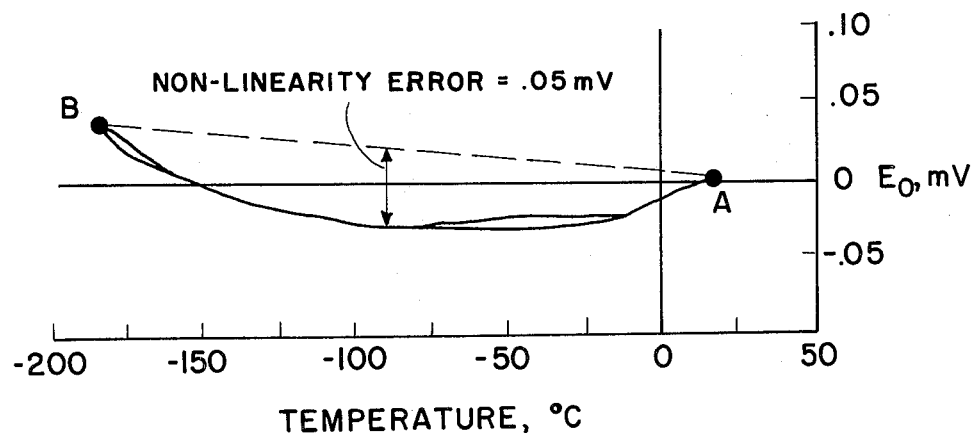
FIG. 4 is a graphic illustration of typical strain gage 'nonlinearity' error normally associated with transient temperatures.

FIG. 4 illustrates the 'nonlinearity' error associated with transient temperatures. Nonlinearity is defined as the maximum deviation of the apparent strain occurring above or below a line drawn between the room temperature apparent strain and the apparent strain at the elevated temperature (line AB). This nonlinearity of 0.05 mV is a function of the differences in the apparent strain curves of the four gages 10 and must be reduced to obtain accurate data.

The apparent strain observed in a four-active-arm resistance strain gage bridge circuit is primarily the result of the differences in the apparent strain curves of the individual gages 10. There are inherent differences in the apparent strain curves of all resistance type strain gages 10. Because these differences are magnified at extreme temperatures, a resulting apparent strain is observed when four of these strain gages 10 are arbitrarily chosen and wired in the bridge circuit. Therefore, it is beneficial to utilize strain gages 10 whose apparent strain curve characteristics are accurately predetermined and matched. By matching strain gages 10 prior to installation on transducers, the inaccuracies accompanying unmatched gages 10 previously discussed are significantly reduced, and the need to compensate for temperature is virtually eliminated.

Figure 5:
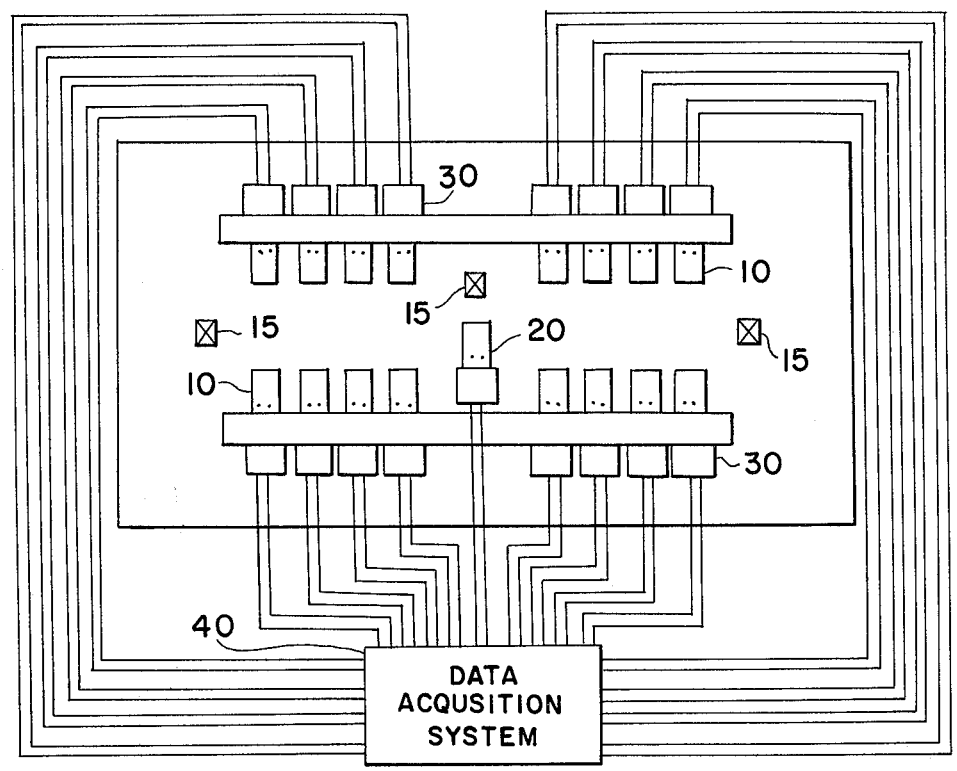
FIG. 5 is a schematic plan view of the gage matching test block connected to a data acquisition system as employed in the present invention.

The present invention accomplishes the matching of apparent strain curves by means of a temporary bonding system and computer data comparison of apparent strain curve characteristics. FIG. 5 presents a schematic plan view of the gage matching test block 25 utilized in this process. Prior to installing the temporarily bonded gases 10, one reference strain gage 20 of the same type as the temporarily bonded gages 10 is permanently bonded to the test block 25. This gage 20 serves as a reference for the temporarily bonded gages 10 and verifies that the apparent strain curves of the temporary gages 10 are tracking not only with respect to each other, but with respect to a permanently bonded gage installation.

The gages 10 are then positioned and bonded to the test block 25 with a suitable adhesive having the inherent physical property characteristic of disintegrating or becoming ineffective when heated and maintained at temperatures approaching or exceeding 170° F. for a period of time. In the specific example described herein, a methyl-2-cyanoacrylate adhesive was employed using the manufacturer's standard bonding procedures. This adhesive is available under the tradename M-Bond 200 ®, from the Permabond International Corporation, 480 South Dean Street, Englewood, N.J. Thermocouples 15 are placed at various locations on the test block 25 to monitor temperature, and the gage terminals 30 are individually connected to a suitable data acquisition system 40. In the specific embodiment of the present application described herein, a Tektronix 4051 basic language computer is utilized. The optimum number of gages 10 to be matched at one time with the available computer system is sixteen.

Figure 6:
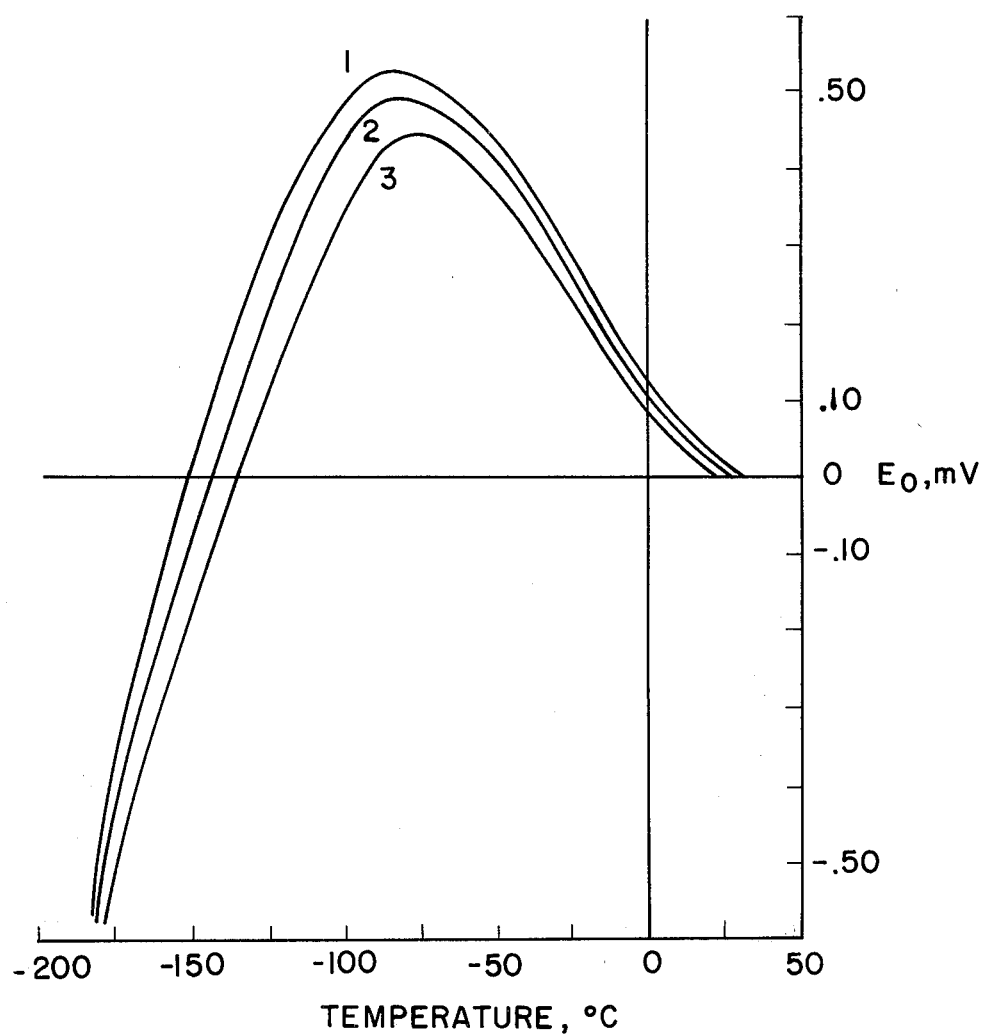
FIG. 6 is a graphic illustration of typical apparent strain curves for several strain gages obtained according to the present invention.

Test block 25 is then placed in a test chamber and subjected to a predetermined temperature excursion. The data acquisition system samples the output of the gages 10 at selected temperature intervals throughout the excursion. FIG. 6 illustrates typical apparent strain curves for several individual strain gages 10. These curves represent the voltage across the strain gage 10 at all points throughout a temperature excursion between ambient and −180° C. Thus, curve I represents the voltage across strain gage #1 as a function of temperature, curve II is for strain gage #2, etc.

Once the data is collected, the computer matches groups of four strain gage outputs by mathematically adding and subtracting the individual outputs to simulate the resultant output as if they were in a single bridge (see equation (1)). The computer is, in essence, making all possible combinations of the apparent strain curves of the gages 10 to identify groups of four which should be used together. Thus, the computer matches groups of four gages 10 whose combined bridge output falls within the tolerances for loop, nonlinearity and temperature induced apparent strain error established by the test operator. Typical values for these tolerances are 0.1 mV, 0.01 mV and 0.02 mV respectively. It is important to reiterate that although the present disclosure utilizes a computer, the matching process may be effectuated by any conventional procedure or by manual comparison of the data.

Figure 7:
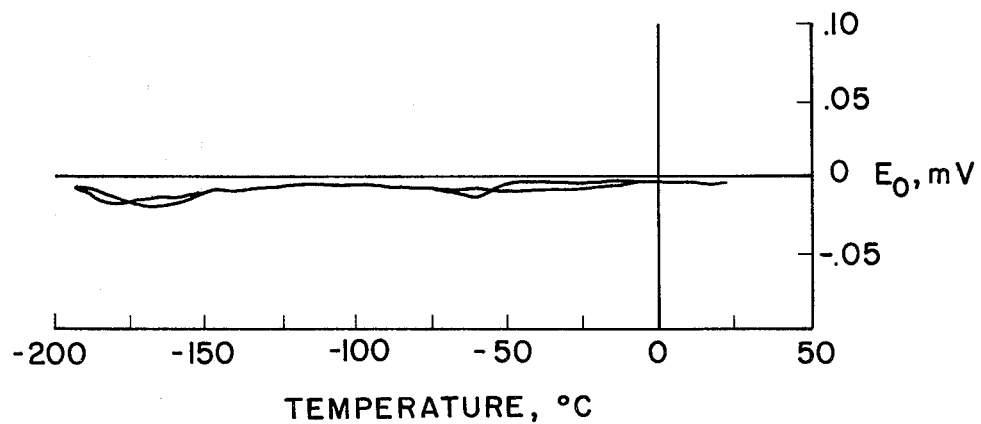
FIG. 7 is a graphic illustration of the apparent strain curve for a circuit of matched gages obtained by the present invention.

FIG. 7 presents a graphic illustration of the apparent strain curve for a circuit of matched strain gages subject to a temperature excursion from ambient to −195° C. and back to ambient. The loop, nonlinearity and temperature induced errors associated with transient temperatures are well within the established tolerance limits and, indeed, have been virtually eliminated. By identifying appropriate groups of four gages 10, the inaccuracies accompanying unmatched gages are greatly reduced and the need to compensate for temperature is virtually eliminated. Although the present invention is applicable for comparing any strain gages, the gages 10 utilized in the specific example described herein are series SK-11-050AH-350, manufactured by Micro-Measurements, P.O. Box 27777, Raleigh, N.C.

Once the data is obtained, the test block 25 is heated to approximately 170° C. and maintained at this temperature for approximately two hours, thereby permitting the bonding agent to disintegrate adequately to release the bonded strain gages 10. The wiring is then disconnected by remelting the solder joints, and the strain gages 10 cleaned to remove any residual materials. This cleaning process involves flushing each gage 10 with trichloroethane and pumicing the underside of each with a grit powder. The power used in the present disclosure is a #3 aluminum oxide powder abrasive (50μ particle size). Each gage 10 is then flushed with a water soluble, 5% ammonia solution, and washed with hot water. The final step involves flushing the gages 10 with pure grain alcohol. After the cleaning process, the gages 10 are ready for use on transducers in the groups of four chosen by the computer.

Although the invention has been described relative to a specific application thereof, it is not so limited and numerous variations and modifications will be readily apparent to those skilled in the art in light of the above teachings. It is therefore to be understood that within the scope of the appended claims, the invention may be practiced otherwise than as specifically described.

What is claimed as new and desired to be secured by Letters Patent of the United States is:

1. A method of calibrating strain gages for transducer applications comprising:
   securing a reference strain gage to a test block;
   adhesively attaching a plurality of strain gages to be calibrated to the test block;
   connecting at least one thermocouple to the test block for monitoring temperature;
   coupling the reference gage and a plurality of strain gages to a data acquisition system;
   subjecting the test block and attached apparatus to a predetermined temperature excursion;
   collecting strain gage response data throughout the temperature excursion;
   matching the strain gages through data comparison of the strain gage response data;
   removing the plurality of adhesively attached strain gages from the test block; and
   decoupling and cleaning the strain gages to prepare them for permanent installation on transducers.

2. The method of claim 1 wherein the step of cleaning the strain gages includes flushing each gage with trichloroethane, pumicing the underside of each gage with a grit powder, flushing each gage with an ammonia base neutralizer and then with hot water, and washing the gages with pure grain alcohol.

3. A method of calibrating strain gages for transducer applications comprising:
   securing a reference strain gage to a test block;
   attaching a plurality of strain gages to be calibrated to the test block with a temporary bonding agent;
   connecting at least one thermocouple to the test block for monitoring temperature;
   coupling the reference gage and a plurality of strain gages to a data acquisition system;
   subjecting the test block and attached apparatus to a predetermined temperature excursion;
   collecting strain gage response data throughout the temperature excursion;
   matching the strain gages through data comparison of the strain gage response data; and
   wherein the temporary bonding agent is a methyl-2-cyanoacrylate adhesive that disintegrates adequately at approximately 170° C. to release the bonded strain gages.

* * * * *